G. W. JONES.
Churn-Motor.
No. 204,049. Patented May 21, 1878.
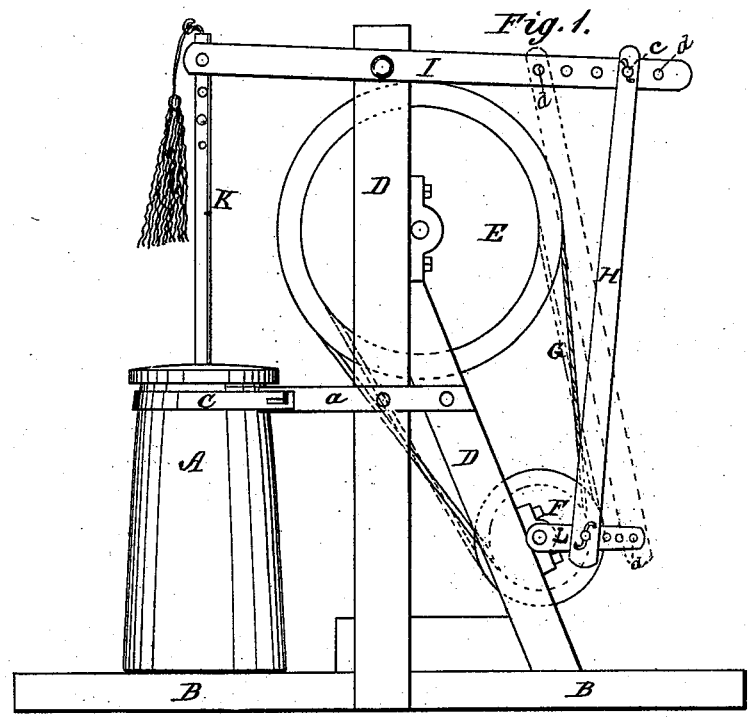
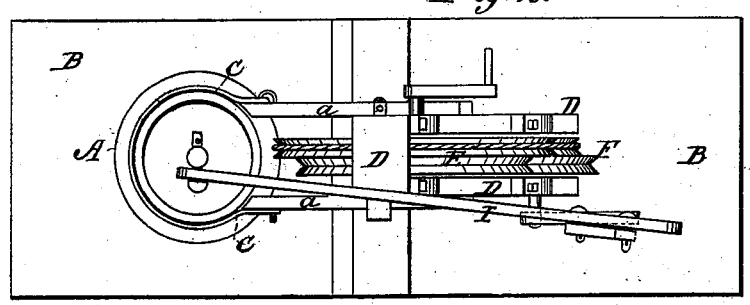
WITNESSES:
W. W. Hollingsworth
Solon C. Kemon
INVENTOR:
Geo. W. Jones
BY
ATTORNEYS.
N. PETERS, PHOTO-LITHOGRAPHER, WASHINGTON, D. C.

UNITED STATES PATENT OFFICE.

GEORGE W. JONES, OF FARMINGTON, KENTUCKY.

IMPROVEMENT IN CHURN-MOTORS.

Specification forming part of Letters Patent No. 204,049, dated May 21, 1878; application filed February 26, 1878.

*To all whom it may concern:*

Be it known that I, GEORGE W. JONES, of Farmington, in the county of Graves and State of Kentucky, have invented a new and Improved Churn; and I do hereby declare that the following is a full, clear, and exact description of the same.

The invention is an improvement in the class of churning apparatus in which the dasher is reciprocated by means of a lever and hand crank-shaft.

The invention consists in the construction and arrangement of parts, as hereinafter described and claimed.

In the accompanying drawing, forming part of this specification, Figure 1 is a side elevation, and Fig. 2 a plan view, of my improved apparatus.

The vertical churn-tub A is placed, when in use, upon a platform, B, and temporarily secured by a band, C, in contact with the ends of horizontal bars $a$ $a$, which form a rigid portion of the upright frame-work D. The band C may be readily detached to allow removal of the churn-tub; but when placed around it the tub is held firmly supported by the bars $a$ $a$. The frame-work D is permanently attached to the platform B, and between its parallel bars are placed the large and small differential band-wheel and pulley E and F, the same being supported in suitable bearings, as shown.

A band, G, passes around the wheel E and pulley F, and the crank on the axis of the latter is connected by a rod, H, with a lever, I, fulcrumed on the frame D, and also jointed to the dash-rod K. Thus the rotation of the wheel E causes the more rapid rotation of pulley F, and thereby oscillates the lever I and reciprocates the churn-dasher.

The crank of pulley F and the rear end of lever I have a number of holes, $d$, as shown, to receive the joint-pin $c$ of pitman H, so that the latter may be shifted according to the quantity of cream to be churned at a given time. For example, when the quantity of cream is small, the pitman is attached to the crank near its inner end and to the lever I near its outer end, and the belt G is also arranged on the large side of wheel E and small side of pulley F, as shown in full lines. Thus I obtain a short but rapid reciprocation of the dasher with expenditure of but slight force. When there is a large quantity of cream to be churned, the position of pitman H is reversed or changed, it being then attached, as shown in dotted lines; and the belt is also shifted to the small side of wheel E and large side of pulley F, so that I have as the result a longer and slower stroke of the dasher by the expenditure of but slight additional force.

The upper end of the dash-rod is perforated, to allow change in the point of attachment of the rod to the lever I, according to the depth of cream in the tub.

I do not claim, broadly, the employment of a mechanism consisting of a pulley, belt, pitman, and lever for operating a churn-dasher; but

I claim—

The combination, in a churning apparatus, of the differential double wheel and pulley E F, the belt G, the crank L, and lever I, each provided with the series of holes $d$, the pitman H attached thereto, and the dasher-rod K, all constructed and arranged as shown and described, whereby the described adjustment of parts may be made according to the quantity of cream to be churned.

GEORGE W. JONES.

Witnesses:
S. J. EASBY,
G. W. THOMPSON.